(12) United States Patent
Seedorf et al.

(10) Patent No.: US 9,826,058 B2
(45) Date of Patent: Nov. 21, 2017

(54) METHOD FOR OPERATING A NETWORK

(71) Applicant: NEC EUROPE LTD., Heidelberg (DE)

(72) Inventors: Jan Seedorf, Heidelberg (DE); Mayutan Arumaithurai, Goettingen (DE); Edo Monticelli, Munich (DE)

(73) Assignee: NEC Corporation, Tokyo (JP)

( * ) Notice: Subject to any disclaimer, the term of this patent is extended or adjusted under 35 U.S.C. 154(b) by 99 days.

(21) Appl. No.: 14/769,821

(22) PCT Filed: Feb. 21, 2014

(86) PCT No.: PCT/EP2014/053454
§ 371 (c)(1),
(2) Date: Aug. 24, 2015

(87) PCT Pub. No.: WO2014/131707
PCT Pub. Date: Sep. 4, 2014

(65) Prior Publication Data
US 2016/0014229 A1   Jan. 14, 2016

(30) Foreign Application Priority Data
Feb. 27, 2013   (EP) .................................... 13156895

(51) Int. Cl.
*H04L 29/08* (2006.01)
*H04L 29/06* (2006.01)
*H04L 12/859* (2013.01)
*H04L 12/875* (2013.01)
*H04L 12/863* (2013.01)
*H04L 12/851* (2013.01)
*H04L 12/865* (2013.01)

(52) U.S. Cl.
CPC ........ *H04L 67/322* (2013.01); *H04L 47/2441* (2013.01); *H04L 47/2475* (2013.01); *H04L 47/56* (2013.01); *H04L 47/6215* (2013.01); *H04L 47/6275* (2013.01); *H04L 65/4084* (2013.01); *H04L 65/80* (2013.01)

(58) Field of Classification Search
CPC ............... H04L 67/322; H04L 47/6215; H04L 47/6275; H04L 47/2441; H04L 49/109; H04L 49/101; H04L 49/506
See application file for complete search history.

(56) References Cited

U.S. PATENT DOCUMENTS 6,775,231 B1    8/2004  Baker et al.
2002/0188732 A1* 12/2002  Buckman ............ H04L 12/5695
                                                              709/228

(Continued)

*Primary Examiner* — Jamal Javaid
(74) *Attorney, Agent, or Firm* — Leydig, Voit & Mayer, Ltd.

(57) ABSTRACT

A method operates a network, wherein multiple clients are connected to a server for accessing an application that is provided or running on the server. The application is tunneled within one or more corresponding flows between the clients and the server. A device for per flow scheduling of the flows prioritizes the flows based on at least one of application characteristics, application requirements, flow characteristics or flow requirements. The prioritizing by the device takes into consideration a change or a variation, over time, of at least one of an application characteristic, an application requirement, a flow characteristic or a flow requirement.

23 Claims, 1 Drawing Sheet

(56) References Cited

U.S. PATENT DOCUMENTS

| | | |
|---|---|---|
| 2006/0133346 A1* | 6/2006 | Chheda .............. H04L 12/5695 |
| | | 370/352 |
| 2006/0146721 A1* | 7/2006 | Attar .................... H04L 1/0002 |
| | | 370/238 |
| 2007/0136372 A1 | 6/2007 | Proctor et al. |
| 2010/0235512 A1 | 9/2010 | Beser |
| 2012/0078994 A1 | 3/2012 | Jackowski et al. |
| 2012/0096365 A1* | 4/2012 | Wilkinson ............. G06F 9/468 |
| | | 715/740 |

* cited by examiner

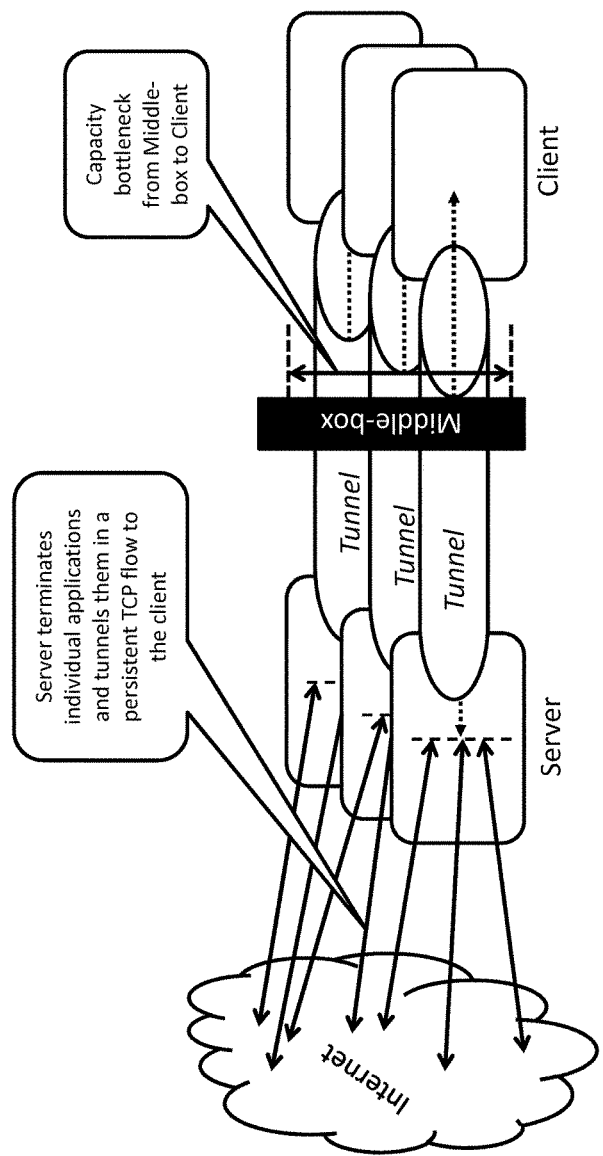

METHOD FOR OPERATING A NETWORK

CROSS-REFERENCE TO PRIOR APPLICATIONS

This application is a U.S. National Phase application under 35 U.S.C. §371 of International Application No. PCT/EP2014/053454, filed on Feb. 21, 2014, claiming priority to European Patent Application No. EP 13156895.8, filed on Feb. 27, 2013. The International Application was published in English on Sep. 4, 2014 as WO 2014/131707 under PCT Article 21(2).

FIELD

The present invention relates to a method for operating a network, wherein multiple clients are connected to a server for accessing an application that is provided and/or running on the server, wherein the application is tunneled within one or more corresponding flows between the clients and the server, wherein a device for per flow scheduling of the flows prioritizes flows based on application characteristics and/or requirements and/or flow characteristics and/or requirements and wherein the prioritizing by the device takes into consideration a change or a variation of an application characteristic and/or requirement over time and/or of a flow characteristic and/or requirement over time.

Further, the present invention relates to a network, preferably for carrying out the method for operating a network, wherein multiple clients are connected to a server for accessing an application that is provided and/or running on the server, wherein the application is tunneled within corresponding flows between the clients and the server, wherein a device for per flow scheduling of the flows is designed for prioritizing flows based on application characteristics and/or requirements and/or flow characteristics and/or requirements and wherein—for the prioritizing—the device is further designed for taking into consideration a change or a variation of an application characteristic and/or requirement over time and/or of a flow characteristic and/or requirement over time.

The present invention can preferably be applied to thin-client based networks. Thin-client based solutions allow users to connect to remote servers and access content that is running on the server within a virtual PC. This is analogous to having physical access to the remote server. The application logic is performed on the remote server and served to the client. E.g, when a user watches a video on a remote server, the remote server performs decoding using the appropriate codecs and displays the video on the player, and this entire graphical display is sent to the client. Note that when a client clicks on the client to perform an action, e.g. pause the video, this action is sent to the remote server which in turn does the necessary action. Such thin-client based solutions facilitate software updates—updates are run on the server—, storage, backup, energy-efficiency and etc.

BACKGROUND

Microsoft Remote Desktop Protocol, RDP, and Citrix High Definition user eXperience, HDX, are popular examples of thin-client services. Thin-client solutions were initially designed for LAN environments, e.g. a single office, where all the employees connect to the remote server via thin-clients. But with the advent of Data-centers and cloud based solutions, thin-client deployments on cloud services is increasing in popularity. Unfortunately, since the traffic has to traverse through the Internet, it introduces issues such as latency, packet drops and etc, which in turn affect the Quality of Experience, QoE, for the user. This becomes all the more important when the user is interacting with the application, e.g. writing an email, having a voice chat, performing mouse clicks and etc.

SUMMARY

The vast majority of existing scheduling algorithms are not designed for per flow scheduling due to scalability reasons. Still, state of the art solutions that apply per flow scheduling, and in addition based on the application type of the individual flow, exist. However, in contrast to the scenario and scope of an embodiment of the invention at hand, i.e. thin client connections, these solutions work/target only other scenarios with at least one of the following limitations:

- The application running in an individual flow is not changing over time, i.e. when the user starts a new application, a new TCP/UDP, Transmission Control Protocol/User Datagram Protocol, session is started, therefore flows are usually assigned to a certain class for their lifetime.
- The solutions do not take into account the varying RTT and bandwidth requirements of each flow over time, i.e. the varying QoE at the user for a fixed application type that changes dynamically over time within a single thin client flow.
- The solutions "know" the application type of each flow, e.g. because it is being sent along with the flow in a flag, i.e. they do not have to estimate it.
- In U.S. Pat. No. 6,775,231 B1, it was proposed that the mechanism dynamically adjust weights for queues based on packet arrival rates similar to what in embodiments of the present invention machine learning or application identification does, but a) the cited invention does not re-compute weights of a flow based on a QoE threshold that changes dynamically because the application within a flow is changing dynamically, and b) the cited invention does not re-assign flows to queues dynamically; instead, it is based on a DiffServ-like model, where the allocation of flow to class is static.

In an embodiment, the present invention provides a method for operating a network, wherein multiple clients are connected to a server for accessing an application that is provided or running on the server. The application is tunneled within one or more corresponding flows between the clients and the server. A device for per flow scheduling of the flows prioritizes the flows based on at least one of application characteristics, application requirements, flow characteristics or flow requirements. The prioritizing by the device takes into consideration a change or a variation, over time, of at least one of an application characteristic, an application requirement, a flow characteristic or a flow requirement.

BRIEF DESCRIPTION OF THE DRAWINGS

The present invention will be described in even greater detail below based on the exemplary FIGURE. The invention is not limited to the exemplary embodiments. Other features and advantages of various embodiments of the present invention will become apparent by reading the following detailed description with reference to the attached drawing which illustrates the following:

FIG. 1 illustrates a system and a process according to an embodiment of the present invention.

DETAILED DESCRIPTION

In an embodiment, the present invention improves and further develops a method for operating a network and an according network for allowing a very high Quality of Experience for a user within a network wherein applications are tunneled between clients and a server.

According to an embodiment of the present invention, it has been recognized that it is possible to allow a very high Quality of Experience, when a device for per flow scheduling of the flows prioritizes flows based on application characteristics and/or requirements and/or flow characteristics and/or requirements and when the prioritizing by the device takes into consideration a change or a variation of an application characteristic and/or requirement over time and/or of a flow characteristic and/or requirement over time. The consideration of a change or a variation of said characteristics and/or requirements provides a reliable adaptation to changing characteristics and/or requirements within a connection between clients and a server and/or with regard to a tunneled application. The users of thin-client or other tunneled applications are able to see an improvement in their QoE during congestion periods. Overall, the invention allows for a device to schedule thin-client flows or tunneled flows such that overall QoE of users is improved even in congested downstream/access networks. Currently, when there is congestion for a short period, users watching video or using delay sensitive applications observe a lag once in a while. The present invention provides a scheduling which helps in preventing such a lag.

Within a concrete embodiment an application requirement or flow requirement can be a QoE requirement or threshold and/or bandwidth requirement or threshold. Additionally or alternatively, an application characteristic or flow characteristic can comprise a Round-Trip Time, RTT. Thus, an individual scheduling or prioritizing can be performed based on different requirements and/or thresholds.

Within a preferred embodiment of the present invention, the device can prioritize a flow with a delay-sensitive application. Thus, it is possible to support delay-sensitive applications without unwanted lags.

For providing a very effective scheduling and prioritizing of flows within the network the flows can traverse the device. Thus, all important flows can be scheduled by the device without the risk of overlooked flows.

Within a further concrete embodiment of the present invention, the connections between the clients and the server can be thin-client connections. However, also other connections with tunneled applications can benefit from the present invention.

For providing a very secure use of a network the application or connections between the clients and the server can be encrypted. There are different possibilities in encrypting applications or connections and a user can select a suitable encryption depending on the individual situation.

For providing a reliable scheduling and prioritizing a per flow application identification can be available to the device. Such an application identification can reveal the type or characteristics of the tunneled application. Depending on the individual situation the per flow application identification can be statistical.

Within a preferred embodiment of the present invention, the per flow application identification can be based on an estimation of application type and/or of RTT of each flow and/or of QoE expectation for the flow and/or of bandwidth requirement for the flow. Thus, the application identification must not provide an exact definition of the tunneled application.

For providing a very high QoE the scheduling or prioritizing can be performed periodically or dynamically. In this way changing or varying characteristics and/or requirements can be compensated and a high level of QoE can be reached and/or maintained.

Within a concrete realization of an embodiment of the present inventive method during scheduling or prioritizing the flows can be assigned to queue classes based on current application characteristics and/or requirements and/or their flow characteristics and/or requirements. Based on such queue classes a simple and reliable scheduling or prioritizing is possible.

Further, for effective scheduling of the flows during scheduling or prioritizing individual weights can be assigned to the queue classes based on their current characteristics and/or requirements. Based on such weights an effective scheduling of different classes is possible.

Concretely, during scheduling or prioritizing the queue classes can be assigned a bandwidth corresponding to the characteristics and/or requirements of the flows within each individual queue class. Thus, each queue class can be assigned the necessary bandwidth for providing applications with high quality.

Within a further concrete embodiment of the present invention, the prioritizing by the device can be based on a Delay Budget, DB, which is defined as the difference between the optimal time a flow requires to be within the application requirements and/or flow requirements for its application type and its current average RTT. Based on such a Delay Budget a very simple and effective scheduling or prioritizing is possible.

Further concretely, within a very simple preferred embodiment of the present invention, during scheduling or prioritizing the flows can be classified into m queue classes $C=c_1, c_2, \ldots, c_m$ depending on their Delay Budget, wherein m is a positive integer. Further preferred, class $c_k$ that belongs to C can have a maximum Delay Budget, $DB_{max}(c_k)$, and classes can be ordered such that if $k<h$, then $DB_{max}(c_k)<DB_{max}(c_h)$, wherein h and k are positive integers. Further, each flow $f_i$ can get allocated to the class $c_k$ with the lowest $DB_{max}(c_k)$ that is higher than $DB(f_i; t_j)$, i.e. flows get allocated to the lowest class which has a higher maximum Delay Budget than the current Delay Budget of the flow, wherein i, j and k are positive integers and t is a point in time. For providing a very actual and effective scheduling or prioritizing the allocation can be performed periodically.

Within a further preferred embodiment of the present invention, during scheduling or prioritizing each class $c_k$ can get assigned a weight $w(c_k, t_j)$ which is calculated based on the Delay Budgets of the flows in that class $[DB(f_i, t_j)]$ and on the bandwidth requirements of the flows in that class $[BR(f_i, t_j)]$ for all $f_i$ in $c_k$, wherein i, j and k are positive integers and t is a point of time. Thus, a very effective scheduling or prioritizing can be performed on the basis of the weights w. For providing a very effective scheduling or prioritizing the assignment can be performed periodically.

For providing a very reliable method for each queue class there can be a scheduling queue and the outgoing bandwidth of each queue can be proportional to the weight of its queue class.

Within a further embodiment of the present invention, during scheduling or prioritizing weights can be assigned to queue classes proportional to the number of flows currently allocated to that queue class and inversely proportional to the Delay Budgets of these individual flows. In this way a very high QoE can be provided for individual applications.

Within the scope of the present invention, accessing an application can comprise accessing a content that is provided on the server. Thus, the present invention provides a very flexible method and network.

Within a further preferred embodiment of the present invention, the device can be realized close to the server or within the server. In this way, communication paths can be kept short and an effective method and network can be provided.

Embodiments of the present invention pursue the idea of providing preferential treatment to certain tunneled or thin-client flows over the rest of the tunneled or thin-client flows traversing the same intermediate node. The preferential treatment is based on the application that the user is using, i.e. provides for example priority to tunneled or thin-client flows that are serving delay-sensitive applications. In other words, it is one goal of the invention to prioritize flows based on the individual QoE requirements of the tunneled or thin client traffic flows.

There apparently exists no per flow scheduling algorithm to the specific—but very relevant in practice—scenario that is within the scope of embodiments of the present invention: Preferably encrypted thin client connections—or more general connections where the "real application" the user is executing is tunneled, oblivious to an intermediate node which just sees the "tunneled" flow—where the application running in each flow—and correspondingly the QoE expectation and bandwidth requirements for the flow—as well as the RTT of each flow changes over time and has to be somehow estimated and used in a timely, scalable manner. One core challenge is thus the design of a scheme that balances the computation complexity of the scheduling algorithm with fast enough reaction to changing conditions within the network and the individual flows. This invention tackles this challenge and proposes a general scheme as a solution.

In a scenario, where a middlebox through which multiple tunneled client-server connections run wants to prioritize certain flows based on application-dependent QoE requirements, but the flows constitute "tunneled"—usually encrypted—applications, such that the middlebox only sees the tunneling application, e.g. Secure Shell, SSH, RDP, . . . , but not the actual applications running in the tunnel, i.e. video, audio, data, but where however some sort of—most likely statistical—per-flow application identification is available to the middlebox, where further the actual, i.e. inner, application running in a single tunnel flow can change over time, so that consequently the QoE threshold for a single persistent tunnel flow can change significantly and rather quickly frequently over time each time the user changes the actual application running in the tunnel, QoE-driven scalable per-flow middlebox scheduling is achieved by periodically applying a scheduling technique—a hybrid scheme which is an aspect of the invention—and taking into account the dynamically changing delay and bandwidth requirements of "inner", i.e. tunneled, applications. The flows are dynamically assigned to queue classes based on their current requirements and the queue classes are assigned a bandwidth that is in accordance with the bandwidth requirements of the different flows in that queue class.

Further important aspects of embodiments of the invention can be summarized as follows:

1) Presenting a scheduling technique that enables scalable deadline-driven per-flow scheduling in scenarios where some sort of most likely statistical application identification is available to a middlebox, where the application type and consequently the QoE threshold and bandwidth requirements of individual flows can change dynamically over time but somehow identified by the middlebox, where earliest-deadline-like scheduling is applied periodically such that the assignment of flows to queuing classes and the assignment of outgoing bandwidth to queues is re-computed frequently based on a) the current delay budget, Tolerable RTT—current RTT, and b) the current bandwidth requirements of individual flows.

2) Scalability is achieved by the design of a hybrid scheme, i.e. a specific combination of different scheduling techniques, which accounts for the fact that the QoE threshold of a flow can change over time and which has significantly less complexity—with respect to CPU load caused by scheduling—than a pure Earliest Deadline First, EDF, approach but still allows to prioritize flows dynamically depending on their "deadline", i.e. the difference between their maximum tolerable RTT and their current RTT.

3) The users of thin client or other tunneled applications are able to see an improvement in their QoE during congestion periods.

4) Overall, the invention allows for a middle-box to schedule tunneled or thin client flow such that overall QoE of users is improved even in congested downstream/access networks.

5) Currently, when there is congestion for a short period, users watching video or using delay sensitive applications observe a lag once in a while. The solution according to the embodiments of the present invention, by prioritizing delay sensitive flows helps in preventing such a lag.

Current state of the art does not provide efficient middlebox based enhancement for tunneled or thin-client based flows. They provide server-client based optimization like optimizing the image that is transferred, but does not provide scheduling based preferential treatment.

FIG. 1 shows the general scenario targeted by embodiments of the present invention: A middle-box—the device for per flow scheduling of the flows—can see tunneled flows only at the level of the tunneling protocol, e.g. RDP or SSH, which is running over a transport protocol, e.g. TCP. Given that the middle-box can somehow estimate the higher-layer application running within each flow—which is dynamically changing within a persistent tunnel flow—, it can apply scheduling on the transport layer in order to prioritize certain flows for a certain amount of time depending on the dynamically changing application type running within a given tunnel flow. Note that the server terminates individual application flows to the Internet and tunnels the application into an existing tunnel flow to the client.

Embodiments of the present invention apply preferential treatment to flows based on some application identification at some middlebox:

Application identification:

One of the challenges of providing preferential treatment to thin-client flows is that it is not straightforward to identify the application being used by the client. One cannot use techniques such as port based application identification since the thin-client flows are usually directed towards the same port, e.g., port 3389 for RDP, and the user might change the application that he is using during the course of a session. Moreover, the data exchanged between the remote server and the thin-client is in the form of images, e.g. bitmaps. In order to identify the application being used by the client, a number of approaches such as the ones listed below could be used:
1) Machine learning approach: A machine learning based approach could be used to identify the application. An offline or online machine learning module could make use of packet inter-arrival times to perform machine learning and classify the flows.
2) A header option could be used by the server to signal the current application being used by the user, assuming that the server is able to know/detect applications running within virtual machines.
3) If the middlebox is in very close proximity to the server, e.g. data-center, they could use a separate protocol. Whenever the user switches to or out of a delay-sensitive application, the server could indicate to the middlebox this change.
4) If the server itself is hosting multiple thin-clients, it will be able to prioritize flows that carry delay-sensitive flows.

Note that the present invention does not propose a mechanism to identify the flow, but depends on flows being classified based on the application they serve.

Preferential Treatment:

Embodiments of the present invention deal with a mechanism to provide—potentially—preferential treatment once the application that is being used has been identified. When bandwidth is scarce and several thin-client—or any tunneled—flows are traversing the same bottleneck nodes/paths, preferential treatment could be provided to delay-sensitive applications.

The requirements of such a preferential mechanism invention are as follows:
1) It should have a very low complexity on the node performing the preferential treatment, in order to scale to a large number of flows.
2) It is expected that the user may change the application being used several times during a single session. Therefore the preferential mechanism should be dynamic in nature and function at a small time scale.
3) Since network conditions change frequently in an unpredictable manner, it is essential for the mechanism to function at smaller time scales in order to react to it.

Scenario Envisioned:

The scenario envisioned is that of a middlebox that has thin-client flows passing through it. Note that this box does not need to be congested, i.e. the bottleneck. The only criterion is that it needs to be present before or at the first bottleneck. This middlebox can in fact be very close to the server or the server itself. It will need to know or be able to measure the RTT that the flow is facing.

Applicability of Embodiments of the Invention

For ease of presentation, the proposed invention is explained in the context of thin client connections, see above, and also below. However, it is noteworthy that the invention applies to any scenario where a middlebox through which multiple client-server connections run wants to prioritize certain flows based on application dependent QoE requirements, but the flows constitute "tunneled"—usually encrypted—applications, such that the middlebox only sees the tunneling application, e.g. SSH, RDP, . . . , but not the actual applications running in the tunnel, i.e. video, audio, data, and where further the actual, i.e. inner, application running in a single tunnel flow can change over time, so that consequently the QoE threshold for a single—persistent—tunnel flow can change significantly and rather quickly frequently over time each time the user changes the actual application running in the tunnel.

An embodiment of the invention proposes a solution for the aforementioned problem under the constraints and assumption listed previously, i.e. the node performing the preferential treatment must be present before or at the point of congestion and it must be able to identify the flow at least with a high probability, the application with the stringent demand in case there are multiple applications being watched simultaneously. An embodiment of the invention has the goal of scheduling the flows by assigning it priority based on the delay budget it has and a suitable bandwidth. A delay budget is defined as the difference between the optimal time a flow requires to be within the QoE requirement for its application type and its current average RTT. A flow with a high delay budget compared to the other flows implies that it can afford to be delayed for some time while a flow with a comparatively low delay budget can be scheduled with priority.

The goal of an embodiment of the present invention is to exploit the knowledge of the individual application that runs in each RDP flow, e.g. identified using machine learning, and the measured RTT per flow for treating flows differently. Given that for each flow, a) the application can be identified, and b) its current RTT can be measured, flows can be prioritized depending on how close they are to a QoE threshold, expressed as a maximum tolerable RTT, RTTmax, value for each application type in order to achieve acceptable QoE.

Accordingly, assuming a set F=f1, f2, . . . , fn of n flows that run through the envisioned scheduler, the Delay Budget, DB, can be defined for each flow at time tj as follows:

$$DB(fi,tj)=QT(fi,tj)-RTT(fi,tj)$$

where RTT(fi, tj) is the measured RTT and QT(fi, tj) is the QoE threshold based on the identified application for flow fi at time tj. At any time the scheduler thus knows the Delay Budget for each flow.

Assume further, that—to large extent depending on its individual application type—each flow fi has a certain bandwidth requirement. For instance, video streaming might require x Bit/s downstream bandwidth whereas web browsing might only require y Bit/s downstream bandwidth, where x>y. The scheduler frequently measures and averages bandwidth requirements per flow and thus know at any time tj the average bandwidth requirements for each flow BR(fi, tj).

Earliest Deadline First, EDF, is used in CPU scheduling where jobs that have a low DB are given priority over others. But to use pure EDF for packet scheduling is not feasible. The main issue is that it would introduce search overhead for every packet. E.g., let us assume that a packet with a DB Di arrives, in a pure EDF implementation, this packet will have to be slotted in a spot in the queue such that it is behind packets with DB<Di and ahead of packets with a DB>Di. Doing this operation for every incoming packet is very expensive. Moreover, pure EDF is not a recommended solution when the resource utilization is higher than 100%—as in the target scenario—, since certain flows may starve.

According to an embodiment of the present invention, a hybrid, discrete EDF scheduling scheme uses a combination of weights, classes and EDF. Flows get classified into a set of m classes C=c1, c2, . . . , cm (in general, it can be assumed that there are less classes then flows, i.e. m<n) depending on their Delay Budget. Each class ck that belongs to C has a maximum Delay Budget, DBmax(ck), and classes are strictly ordered such that k<h–>DBmax(ck)<DBmax(ch). Periodically, each flow fi gets allocated to the class ck with the lowest DBmax(ck) that is higher than DB(fi; tj), i.e. flows get allocated to the lowest class which has a higher maximum Delay Budget than the current Delay Budget of the flow. Thus, fi belongs to ck(tj), if a flow fi has been allocated to class ck at time tj.

Each class ck then periodically gets assigned a weight w(ck, tj) which is calculated based on the Delay Budgets of the flows in that class [DB(fi, tj)] and on the bandwidth requirements of the flows in that class [BR(fi, tj)] for all fi in ck. For each class there is a scheduling queue, and the outgoing bandwidth of each queue is proportional to the weight of its class.

Example Algorithms
1. A simple, concrete algorithm might assign weights to classes proportional to the number of flows currently allocated to that class and inversely proportional to the Delay Budgets of these individual flows:

$$w(c_k, t_j) = \sum_{f_i \in c_k(t_j)} \frac{\sum_i^n DB(f_i, t_j) - DB(f_i, t_j)}{\sum_i^n DB(f_i, t_j)}$$

2. A more sophisticated algorithm would assign weights to classes based on the Delay Budgets of flows in the class and the bandwidth requirements of the individual flows, e.g. as follows, alpha and beta are configuration parameters that steer how much to weigh the Bandwidth Requirements of flows and how much to prioritize flows with lower Delay Budget:

$$w(c_k, t_j) = \left( \sum_{f_i \in c_k(t_j)} \beta \times \frac{BR(f_i, f_j)}{\min(BR(F, t_j))} \right) \times (\alpha \times l(c_k))[Mps]$$

where $$l(c_k) = \begin{cases} 1 & \text{if } k = \lceil \frac{m}{2} \rceil \\ 1 + \frac{\lceil \frac{m}{2} \rceil - k}{10} & \text{otherwise} \end{cases}$$

Weights are then normalized over all weights:

$$w_{norm}(c_k, t_j) = \frac{w(c_k, t_j)}{\sum_{i=1,\ldots,m} w(c_i, t_j)}$$

The normalized weights are then multiplied with the overall capacity of the congested downstream link to compute the absolute value, e.g. in Mbps, to assign to the outgoing queue of each individual class.

Key to the weight calculation and the assignment of weights to queues is to find the right frequency of the execution, i.e. balance the tradeoff between highly frequent computation and high accuracy with the overall load of the scheduling algorithm and scalability with number of flows to handle. Here lies the advantage of the invention: By emulating an EDF-style scheduling algorithm, based on the Delay Budget concept, with an adaptation and combination of class-based queuing and weighted fair queuing, it allows to execute an earliest deadline first scheme in intervals and not on a per-packet level. It should be highlighted that the scheduling algorithm needs to be executed more often than the flows are expected to change their properties in order to be effective.

Generalized Scheme

In its generalized form, the scheme of the invention looks as follows: In a scenario where a middlebox through which multiple client-server connections run wants to prioritize certain flows based on their application-dependent QoE requirements, but the flows constitute "tunneled"—usually encrypted—applications, such that the middlebox only sees the tunneling application, e.g. SSH, RDP, . . . , but not the actual applications running in the tunnel, i.e. video, audio, data, but where however some sort of—most likely statistical—per-flow application identification is available to the middlebox, and where further the actual, i.e. inner, application running in a single tunnel flow can change over time, so that consequently the QoE threshold for a single—persistent—tunnel flow can change significantly and rather quickly frequently over time each time the user changes the actual application running in the tunnel, QoE-driven scalable per-flow middlebox scheduling is achieved as follows:

Dynamically, the QoE threshold, its delay, and its bandwidth requirements for each flow may change over time.

Frequently, the current delay and the current bandwidth requirement of each flow is measured, and its "inner" application being identified.

Frequently, the following dynamic re-calibration of a) assignment of flows to classes, i.e. to outgoing queues, and b) assignment of outgoing bandwidth to queues is performed:

Flows get dynamically classified into queues according to their delay budget, i.e. the difference between their current QoE threshold and their current measured RTT.

Queues get assigned an outgoing bandwidth in relation to the current bandwidth requirements and the current QoE thresholds of the flows in the queue.

Prototype Implementation and Results

The proposed scheme can be implemented in Linux—tc module—and shows very satisfying results compared to other approaches in achieving that multiple flows—with different applications and different QoE requirements running in those flows—can each be kept under their individual QoE threshold in a congested scenario.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a network, wherein multiple clients are connected to a server for accessing an application that is provided or running on the server, wherein the application is tunneled within one or more corresponding flows between the clients and the server, the method comprising:
   prioritizing, by a device for per flow scheduling of the flows, the flows based on at least one of application characteristics, application requirements, flow characteristics or flow requirements, and
   tunneling the application within the prioritized flows to the clients through the device disposed in the network between the clients and the server, and
   wherein the prioritizing by the device takes into consideration a change or a variation, over time, of at least one of an application characteristic, an application requirement, a flow characteristic or a flow requirement,
   wherein the prioritizing by the device is based on a Delay Budget, DB, which is a difference between an optimal time a flow requires to be within the application requirements or the flow requirements for an application type and current average Round-Trip Time, RTT, and
   wherein during the scheduling or the prioritizing, the flows are classified into m queue classes C= $c_1, c_2, \ldots, c_m$ depending on the respective Delay Budgets, wherein m is a positive integer.

2. The method according to claim 1, wherein the application requirement or the flow requirement that is used includes at least one of a Quality of Experience, QoE, requirement, a QoE threshold, a bandwidth requirement or a bandwidth threshold.

3. The method according to claim 1, wherein the device prioritizes a flow with a delay-sensitive application.

4. The method according to claim 1, wherein the flows traverse the device.

5. The method according to claim 1, wherein connections between the clients and the server are thin client connections.

6. The method according to claim 1, wherein the application or connections between the clients and the server are encrypted.

7. The method according to claim 1, wherein a per flow application identification is available to the device.

8. The method according to claim 7, wherein the per flow application identification is statistical.

9. The method according to claim 7, wherein the per flow application identification is based on an estimation of at least one of application type, RTT of each flow, QoE expectation for the flow or bandwidth requirement for the flow.

10. The method according to claim 1, wherein scheduling or the prioritizing is performed periodically or dynamically.

11. The method according to claim 1, wherein, during the scheduling or the prioritizing, the flows are assigned to queue classes based on at least one of current application characteristics, current application requirements, current flow characteristics or current flow requirements.

12. The method according to claim 11, wherein during the scheduling or the prioritizing, individual weights are assigned to the queue classes based on their current characteristics or requirements.

13. The method according to claim 11, wherein during the scheduling or the prioritizing, the queue classes are assigned a bandwidth corresponding to the characteristics or the requirements of the flows within each individual queue class.

14. The method according to claim 1, wherein each class $c_k$ that belongs to C has a maximum Delay Budget, $DB_{max}(c_k)$, and classes are ordered such that if k<h, then $DB_{max}(c_k) < DB_{max}(c_h)$, wherein h and k are positive integers.

15. The method according to claim 14, wherein each flow $f_i$ is allocated to the class $c_k$ with the lowest $DB_{max}(c_k)$ that is higher than $DB(f_i; t_j)$, such that flows get allocated to a lowest class which has a higher maximum Delay Budget than the current Delay Budget of the flow, wherein i, j and k are positive integers and t is a point of time.

16. The method according to claim 15, wherein each flow $f_i$ is allocated periodically.

17. The method according to claim 1, wherein during the scheduling or the prioritizing, each class $c_k$ is assigned a weight $w(c_k, t_j)$, which is calculated based on the Delay Budgets of the flows in that class $[DB(f_i, t_j)]$ and on the bandwidth requirements of the flows in that class $[BR(f_i, t_j)]$ for all $f_i$ in $c_k$, wherein i, j and k are positive integers and t is a point of time.

18. The method according to claim 17, wherein each class $c_k$ is assigned periodically.

19. The method according to claim 12, wherein for each queue class, there is a scheduling queue and an outgoing bandwidth of each queue is proportional to a weight of the respective queue class.

20. The method according to claim 1, wherein accessing the application comprises accessing a content that is provided on the server.

21. The method according to claim 1, wherein the device is realized close to the server or within the server.

22. A network comprising:
   multiple clients connected to a server for accessing an application that is provided or running on the server, wherein the application is tunneled within corresponding flows between the clients and the server; and
   a device for per flow scheduling of the flows disposed in the network between the clients and the server, the device being configured to prioritize the flows based on at least one of application characteristics, application requirements, flow characteristics or flow requirements, and to tunnel the application within the prioritized flows to the clients, and wherein, the device is further configured to prioritize the flows based on a change or a variation, over time, of at least one of an application characteristic, an application requirement, a flow characteristic or a flow requirement, wherein the prioritizing by the device is based on a Delay Budget, DB, which is a difference between an optimal time a flow requires to be within the application requirements or the flow requirements for an application type and current average Round-Trip Time, RTT, and wherein during the scheduling or the prioritizing, the flows are classified into m queue classes $C=c_1, c_2, \ldots, c_m$ depending on the respective Delay Budgets, wherein m is a positive integer.

23. A method for operating a network, wherein multiple clients are connected to a server for accessing an application that is provided or running on the server, wherein the application is tunneled within one or more corresponding flows between the clients and the server, the method comprising:

prioritizing, by a device for per flow scheduling of the flows, the flows based on at least one of application characteristics, application requirements, flow characteristics or flow requirements, and tunneling the application within the prioritized flows to the clients through the device disposed in the network between the clients and the server, and wherein the prioritizing by the device takes into consideration a change or a variation, over time, of at least one of an application characteristic, an application requirement, a flow characteristic or a flow requirement, wherein the prioritizing by the device is based on a Delay Budget, DB, which is a difference between an optimal time a flow requires to be within the application requirements or the flow requirements for an application type and current average Round-Trip Time, RTT, and wherein during the scheduling or the prioritizing, weights are assigned to queue classes proportional to a number of the flows currently allocated to that queue class and inversely proportional to the Delay Budgets of the flows.

* * * * *